(12) United States Patent
Tingling

(10) Patent No.: US 7,693,808 B2
(45) Date of Patent: Apr. 6, 2010

(54) METHOD FOR ORDINAL RANKING

(75) Inventor: Peter Maxwell Tingling, Port Moody (CA)

(73) Assignee: Octothorpe Software Corporation, Vancouver (CA)

( * ) Notice: Subject to any disclaimer, the term of this patent is extended or adjusted under 35 U.S.C. 154(b) by 526 days.

(21) Appl. No.: 11/434,603

(22) Filed: May 15, 2006

(65) Prior Publication Data
US 2007/0282775 A1    Dec. 6, 2007

(51) Int. Cl.
*G06N 5/00* (2006.01)
*G06F 17/00* (2006.01)

(52) U.S. Cl. .................. 706/45; 725/28; 725/46; 707/200

(58) Field of Classification Search ............... None
See application file for complete search history.

(56) References Cited

U.S. PATENT DOCUMENTS

| | | | |
|---|---|---|---|
| 4,908,758 A | 3/1990 | Sanders | |
| 5,926,794 A | 7/1999 | Fethe | |
| 6,289,340 B1 | 9/2001 | Puram et al. | |
| 6,826,541 B1 | 11/2004 | Johnston et al. | |
| 6,853,975 B1 | 2/2005 | Dirksen et al. | |
| 2004/0177053 A1* | 9/2004 | Donoho et al. | 706/47 |
| 2006/0256847 A1* | 11/2006 | Nygaard, Jr. | 375/224 |
| 2007/0160963 A1* | 7/2007 | Diaz et al. | 434/219 |
| 2007/0174872 A1* | 7/2007 | Jing et al. | 725/46 |

FOREIGN PATENT DOCUMENTS

WO   WO-2004/111906 A1   12/2004

* cited by examiner

*Primary Examiner*—David R Vincent
*Assistant Examiner*—Kalpana Bharadwaj
(74) *Attorney, Agent, or Firm*—Osha • Liang LLP

(57) ABSTRACT

A method for generating a list of cases that are ranked by desirability (i.e. an ordinal ranking) based on attributes defined by a decision maker, and providing tools to assist the decision maker in statistically analyzing both the data inputted into a decision problem, the outcomes of the ranking process and the quality and consistency of inputs provided by raters.

18 Claims, 3 Drawing Sheets

METHOD FOR ORDINAL RANKING

FIELD OF INVENTION

The present invention relates to the field of decision modeling systems. In particular, to an apparatus and a method for ordinal ranking.

BACKGROUND

Decision makers often have to rank by ordinal preference a myriad of options or cases (hereinafter cases). This process is subject to many types of bias and process failures such that the ranking may not be valid or repeatable and a decision maker may be unduly influenced by his or her prior ratings or those of a fellow decision maker. In addition to the lack of outcome optimization, supporters of alternative cases or their constituents may have particular concern with respect to the perception of fairness or procedural justice and may consider that an outcome was capricious, idiosyncratic, unsubstantiated or discordant with objective measures.

Two-dimensional weighting matrices (i.e. of attribute multiplied by weight) have been used both manually and in conjunction with computer technology in decision making processes. However, the two dimensional weighting matrices approach alone does not provide sensitivity analysis, facilitate a process, provide repeatability and validity, nor allow for diagnostic reporting or illustrate discrepancies between inter- and intra-rater performances. Typically decision making that is based on two dimensional weighting matrices has relied on self-assessment by the raters and is subject to manipulation when the weights are known to the raters. Therefore, the two dimensional weighting matrices approach does not address the types of bias and process failures described above.

Another approach that has been used is conjoint analysis. Conjoint analysis is a statistical technique using a multi-attribute compositional model in which respondents are asked to rank or choose between alternatives based on attributes. This approach is limited to a relatively small set of attributes. As the number of attributes to be considered grows, the number of combinations grows very quickly and the information gathering stage becomes complex.

What is required is a decision support tool to improve the reliability, accuracy and repeatability of decisions involving ranking by ordinal preference.

SUMMARY OF INVENTION

A method for generating a list of cases that are ranked by desirability (i.e. an ordinal ranking) based on attributes defined by a decision maker, and providing tools to assist the decision maker in statistically analyzing both the data inputted into a decision problem, the outcomes of the ranking process and the quality and consistency of inputs provided by raters.

In one aspect the method reduces the impact of the decision process problems described above by the provision of a computer assisted process where the decision maker determines who can participate in the decision process (a.k.a. raters) and the extent to which they can affect or be aware of the outcome; define attributes and their relative weights that are to be applied to the decision problem; facilitate a mechanism where the raters are able to participate in the decision process even if separated by time or geography; evaluate each case against the attributes in a dynamic environment where the relative performance of other cases against the same attributes can be observed and dynamically modified without awareness of the overall effect upon the relative or ordinal ranking of each of the cases; repeat the process and compare results, without seeing the original work; recalculate results both upwards and downwards according to self-defined or externally defined norms; receive, not receive or ignore information from each of the raters; model and analyze the data in order to identify common points of agreement or disagreement; and generate ranking of cases based upon either individual or aggregated data that is supported by analytic processes.

Certain exemplary embodiments can provide a method for ordinal ranking comprising the steps of: defining an case set containing a plurality of cases to be ranked; defining an attribute set containing a plurality of attributes for which a score can be assigned with regard to each case; assigning a weight to each of the plurality of attributes, wherein the sum of the weights equals a total weight; defining a plurality of raters; assigning decision rights to each of the raters, wherein the decision rights govern the raters participation in the steps of defining an attribute set and assigning weights independently for each of the raters, generating an evaluation result set comprising one evaluation result for each one of the plurality of cases and wherein each evaluation result comprises scores, assigned by the rater, for each of the attributes in the attribute set with regard to the case; independently for each of the raters, generating and displaying to the rater, referent data as each evaluation result is generated in the step of generating an evaluation result set; independently for each of the raters, monitoring and providing warnings to the rater if any of a plurality of pre-defined thresholds is violated; independently for each of the raters, repeating the step of generating an evaluation result set to generate one or more additional evaluation result sets, comparing the results of the evaluation result set and the one or more additional evaluation result sets, and providing the outcome of the comparison to the rater; collecting the evaluation result sets generated by each of the raters; aggregating and analyzing the collected evaluation results sets; and generating, responsive to a specified set of the evaluation result sets, a final ordinal ranking of the cases based on the scores contained in the specified set of evaluation result sets and the weights assigned to each of the plurality of attributes.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

Figure 1:
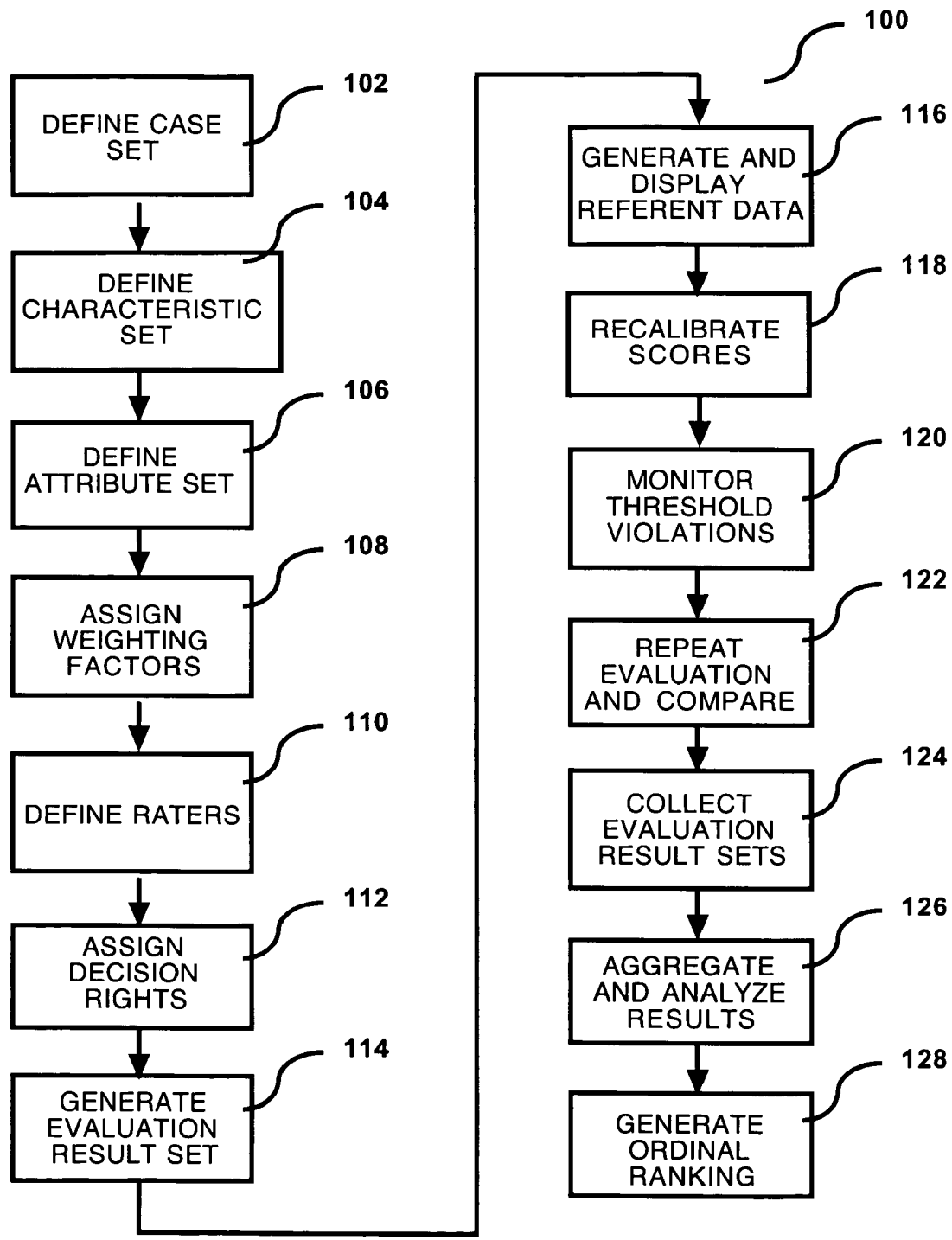
FIG. 1 is a flow diagram representing steps in an exemplary method for ordinal ranking

FIG. 1 is a flow diagram representing steps in an exemplary method 100 for ordinal ranking. The ordinal ranking can be used to determine a solution set. The solution set is a subset selected from a plurality of cases (i.e. alternative selections) in a decision process based on a set of criteria. In step 102 each of a plurality of cases is identified. The cases represent entities that are to be rated and ranked and collectively comprise a case set. In step 104 a characteristic set containing one or more characteristics is defined. Each of the characteristics in the characteristic set represents an informational aspect with regard to the cases that has been identified as relevant to the ranking process. For example, where the cases represent employees, characteristics can include salary, educational credentials, years of service and other similar non-rated aspects. Values can be assigned to each characteristic for each case. In step 106 an attribute set containing one or more attributes is defined. The attributes in the attribute set will be used as the basis for rating each of the cases. Each attribute can be quantitative or qualitative. Each attribute, for example, can be one of a continuous variable, a discontinuous variable, a scale variable (e.g. Likert or Gutman), a discrete variable, a binary variable or other similar multi-valued variable. A minimum and a maximum value for each attribute can optionally be specified in step 106. In step 108 a weighting factor is assigned to each of the attributes. Each weighting factors can, for example, be represented as a percent value wherein the aggregate of the weighting factors for all of the attributes equals 100%. In step 110 one or more raters are defined. In step 112 individual decision rights can be assigned to each rater. Decision rights can include, for example, the ability (or prohibition) of the rater to be aware of (i.e. have visibility to) or to modify the weighting factors. In step 114 an evaluation result set is generated by one rater scoring (i.e. giving values to the attributes with regard to) each of the cases in the case set. Scoring (i.e. giving a value to) each of the one or more attributes represents the rater's assessment of the case for that attribute. Step 114 can be repeated by each of the remaining raters for each of the cases. The rater can evaluate each of the cases in any order and can mark each case for special significance. A special significance indicator can be used, for example, to indicate that the case should be part of or excluded from a solution set irrespective of an ordinal ranking result. Scoring of cases by more than one rater can be concurrent or overlapping. In step 116 referent data is generated and presented to the rater during the scoring of a case in step 114. The referent data can include comparison groups for each attribute (e.g. higher rated cases, peer rated cases and lower rated cases) and values assigned to characteristics associated with each case in step 104. In step 118 the values assigned to an attribute for each of the cases by a rater can be recalibrated based on a schema provided by the rater. For example, the assigned attribute values can be normalized to a specified common average. In step 120 a warning can be presented to the rater when, for example, a pre-determined threshold value has been violated. The pre-determined thresholds can include, for example, a minimum time spent evaluating a case and a maximum number of consecutively evaluated cases receiving similar ratings. In step 122 the rater can re-rate cases starting with either a new empty set of attribute values or an attribute set seeded from the previously scored values in the evaluation result set. During re-rating the values assigned (i.e. scored) to one or more attributes for multiple cases can be presented to the rater to facilitate identification of inconsistencies and differences. The rater can revise the values assigned to any of the attributes for each of the cases. In step 122 the rater also can, in accordance with the decision rights assigned in step 112, modify the weighting factors assigned in step 108. In step 124 evaluation result sets created by each rater are collected and stored in a repository. Each evaluation result set comprises the values assigned to each attribute for each of the cases. The repository can be a computer-readable storage medium. In step 126 the evaluation result sets are aggregated and analyzed. As part of the analysis in step 126 multiple ordinal rankings can be generated. Ordinal rankings of the cases can be generated based on the evaluation results sets provided by any one or more of the raters. The ratings, and the ordinal rankings generated there from, for two or more of the raters can be compared based upon both similarities and differences (i.e. points of agreement and disagreement). Any subset (including all) of the evaluation result sets provided by raters can be used in the final ordinal ranking of the cases. In order to, for example, reduce bias the evaluation result set provided by each rater for a given case can be given equal weighting, one or more raters data can be excluded, the case can be assigned only the highest or lowest evaluation (i.e. score) provided by all raters or highest or lowest score provided for each attribute by each rater can be excluded. The decision owner can also modify the weighting factors assigned in step 108. In step 128 a final ordinal ranking of the cases can be generated based on a specified subset of the evaluation result sets. In step 128 the final ordinal ranking can optionally be arranged into two groupings. The first grouping representing the cases that meet an overall constraint and the second group representing the cases that do not meet an overall constraint. For example, when the decision problem involves an employer who wishes to reduce its staff numbers, the overall constraint can be a total salary budget. The first grouping (i.e. the staff to retain) represents the top ranked cases (i.e. staff members) whose aggregate salaries (calculated from the salary characteristic) is less than or equal to the total salary budget. The second group represents the remaining ranked cases who will not be retained. In step 128 management information on the rating process can also be provided. The management information can include the results of statistical tests conducted on the evaluation result sets. The statistical tests can be conducted to determine if any of the raters exhibits any biases or is predisposed to a particular state in advance of the scoring process. One rater may, for example, be found to prefer cases that have a particular characteristic or trait in common or to have a more critical standard for evaluation than other raters.

Figure 2:
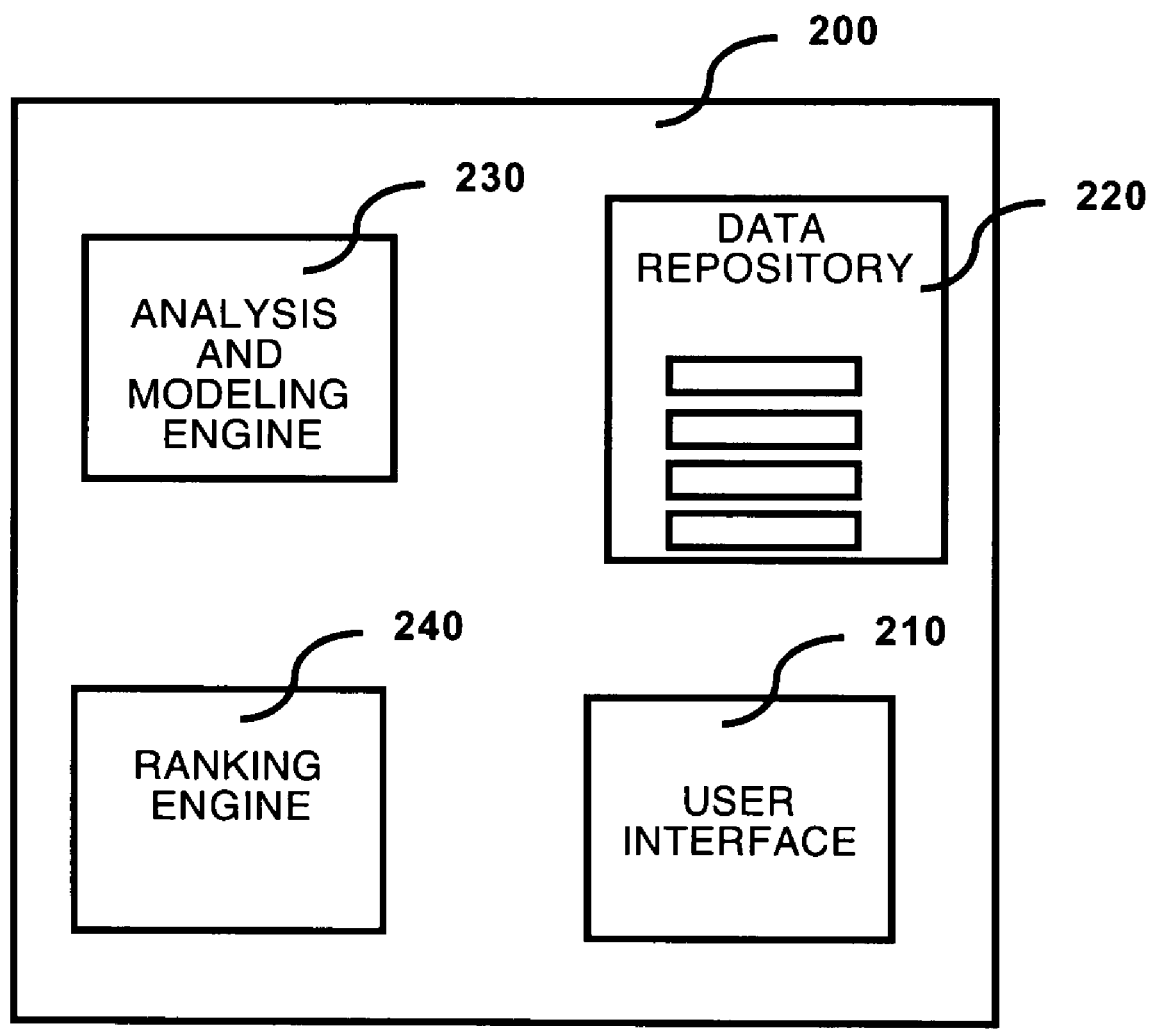
FIG. 2 is a schematic representation of an exemplary apparatus for ordinal ranking

FIG. 2 is a schematic representation of an exemplary apparatus 200 for ordinal ranking. The apparatus 200 comprises a user interface (UI) 210, a data repository 220, an analysis and modeling engine 230 and a ranking engine 240. The UI 210 provides for the presentation of information to and the receiving of inputs from users of the apparatus 200 such as, for example, the decision owner and the raters. The UI 210 can comprise a graphical user interface (GUI) such as those typically provided on personal computing platforms (e.g. a client application or a browser viewable page). Although the UI 210 is represented by a single element in FIG. 2, the UI 210 can comprise multiple GUI distributed over multiple interconnected computing platforms. The data repository 220 comprises an organized computer-readable storage medium such as, for example, a database residing on a hard disk-based storage array. The data repository 220 is preferably a persistent storage medium such as, for example, a hard disk drive, a redundant array of independent disks (RAID), a network-attached storage (NAS) system, a storage area network (SAN) or other similar persistent storage device.

The analysis and modeling engine 230 provides for structured prompting of users (e.g. the raters and the decision owner) for information required by the decision process (including, but not limited to, cases, decision attributes, weighting factors, raters, evaluation result sets and recalibration information), collecting and storing of any information received from the users in data elements, administering raters' decision rights, processing the information in the data elements through modeling and analysis, presenting the results of the modeling and analysis to users via the UI 210.

The ranking engine 240 provides for the generation of ordinal rankings including a final ordinal ranking based on a specified subset (including all) of the evaluation data and the weighting factors. The final ordinal ranking can be stored in the data repository 220 and can be presented to a user via the UI 210.

Figure 3:
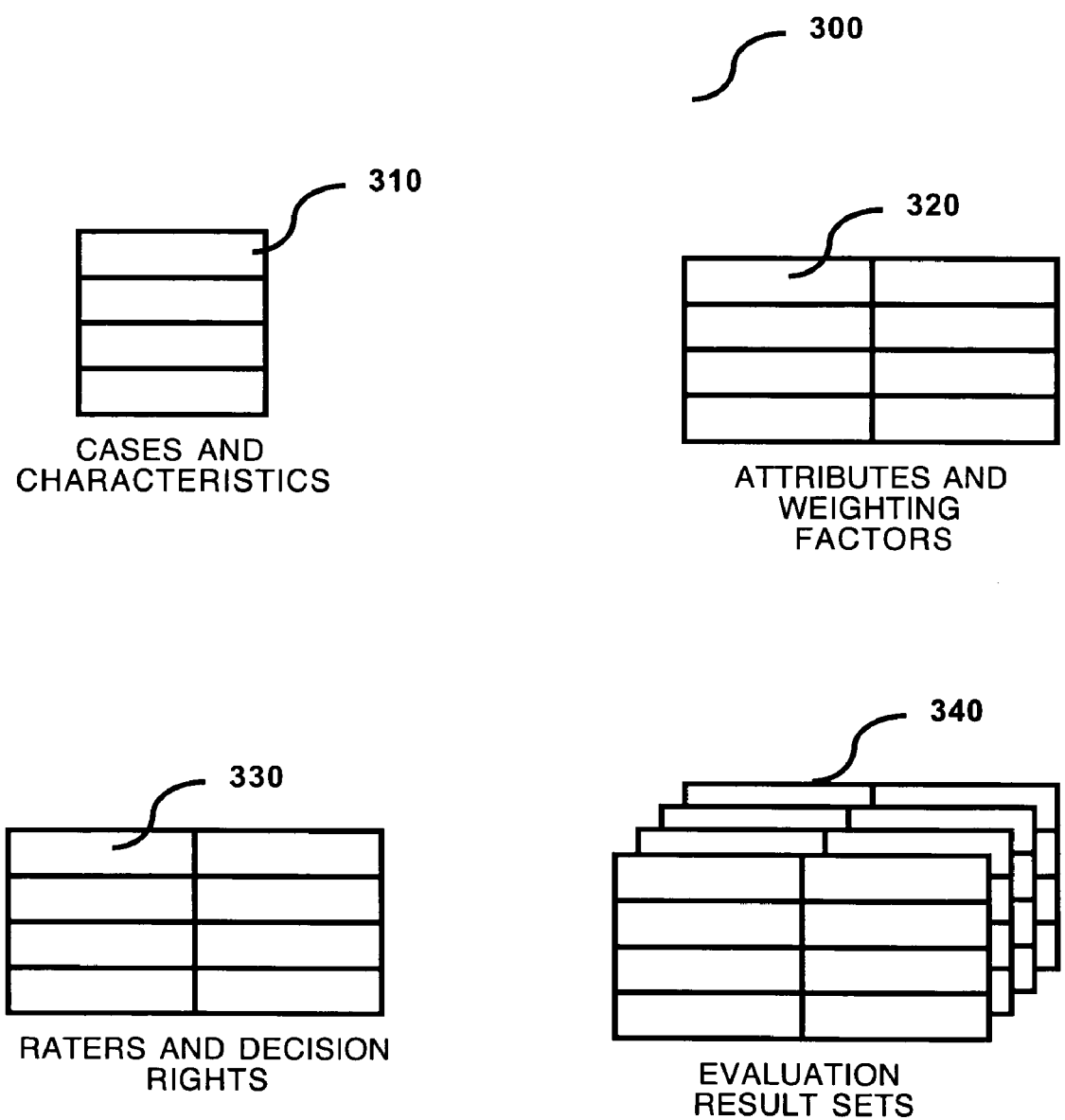
FIG. 3 is a schematic representation of exemplary data elements that can be stored in a data repository.

FIG. 3 is a schematic representation of exemplary data elements 300 that can be stored in the data repository 220. The data elements can include a set of cases and characteristics 310, a set of attributes and associated weighting factors 320, a list of raters and associated decision rights 330 and a plurality of evaluation result sets 340. Each evaluation result set 340 can include scores (i.e. values assigned per attribute) for each of the cases as assigned by one of the raters. The data elements 300 can comprise data entities within a database. In an alternative embodiment the data elements 300 can be arranged in other configurations that represent similar data in support of the apparatus 200.

The method according to the present invention can be implemented as a computer program product comprising computer executable program codes devices stored on a computer readable storage medium.

An example decision problem in which the above described method for ordinal ranking can be used is where an employer wishes to reduce it staff numbers. The method can be used to generate an ordinal ranking of the employees (i.e. cases) based on evaluations (i.e evaluation result sets) provided by evaluators (i.e. raters) chosen, for example, from management and human resources staff. The evaluators score each of employees according to a set of attributes (e.g. productivity, reliability, skill sets, leadership, etc.). An importance (i.e. weighting factor) can be assigned to each of the. The evaluators can take into consideration characteristic (e.g. job function, grade level, salary, tenure, etc.) associated with each employee. As each evaluator scores an employee referent data such as, for example, which other employees the evaluator scored higher, the same and lower for a given attribute can be displayed. Once an evaluator has scored each of the employees, he/she can move all of the scores assigned to the employees, for a given attribute, up or down by normalizing (i.e. recalibrating) the scores to a specified average. The method includes monitoring of threshold violations such as, for example, too little time spent evaluating any employee or too many similarly scored employees. Each evaluator can re-evaluate each employee (starting from an empty set of evaluation results or using the previously scored evaluation results) and compare the results as a means of validating the original evaluations. The evaluations generated by the evaluators can then be collected and further statistical analysis can be carried out to identify statistical anomalies in the scoring of employees such as favoring/disfavoring a particular gender or one's own staff members that are potential indicators of bias or otherwise anomalous results. A final ordinal ranking can be generated from all or a subset of the evaluation results taking into account the weighting factors. The final ordinal ranking can be used to identify which employees will be retained. The method provides for a special significance indicator that can be used by each evaluator to indicate that a certain employee should be either retained or separated irrespective of his/her evaluation results and the final ordinal ranking.

The method of ordinal ranking described herein can be used in numerous other decision problems directed to various domains where it is desirable to ensure that the decision process provides a reliable, accurate and repeatable outcome.

It will be apparent to one skilled in the art that numerous modifications and departures from the specific embodiments described herein may be made without departing from the spirit and scope of the present invention.

What is claimed is:

1. A computer-implemented method for ordinal ranking comprising the steps of:

defining a case set containing a plurality of cases to be ranked;

defining an attribute set containing a plurality of attributes for which a score can be assigned with regard to each case;

assigning a weight to each of the plurality of attributes, wherein the sum of the weights equals a total weight;

defining a plurality of raters;

assigning decision rights to each of the raters, wherein the decision rights govern the raters participation in the steps of defining an attribute set and assigning weights;

independently for each of the raters, generating an evaluation result set comprising one evaluation result for each one of the plurality of cases and wherein each evaluation result comprises scores, assigned by the rater, for each of the attributes in the attribute set with regard to the case;

independently for each of the raters, generating and displaying to the rater, referent data as each evaluation result is generated in the step of generating an evaluation result set, wherein the referent data comprises a comparison group of cases for at least one attribute of the plurality of attributes;

independently for each of the raters, monitoring and providing warnings to the rater if any of a plurality of pre-defined thresholds is violated;

independently for each of the raters, repeating the step of generating an evaluation result set to generate one or more additional evaluation result sets, comparing the results of the evaluation result set and the one or more additional evaluation result sets, and providing the outcome of the comparison to the rater, wherein repeating the step of generating an evaluation result step comprises re-rating each one of the plurality of cases to obtain an additional evaluation result for each one of the plurality of cases and wherein each additional evaluation result comprises scores, assigned by the rater, for each of the attributes in the attribute set with regard to the case;

collecting the evaluation result sets generated by each of the raters;

aggregating and analyzing the collected evaluation results sets; and generating, responsive to a specified set of the evaluation result sets, a final ordinal ranking of the cases based on the scores contained in the specified set of evaluation result sets and the weights assigned to each of the plurality of attributes.

2. The method of claim 1, further comprising the step of defining a characteristic set containing a plurality of characteristics for which a value is assigned with regard to each case; wherein the values assigned to the characteristics can be included in the referent data.

3. The method of claim 1, wherein each of the attributes can be selected from a set comprising: continuous variable, discontinuous variables, scale variables, discrete variables and binary variables.

4. The method of claim 1, further comprising the step of defining a minimum and a maximum value for each of the attributes.

5. The method of claim 1, wherein each evaluation result further comprises a special significance indicator; and further comprising the step of, independently for each rater, setting the special significance indicator for each case to indicate one of inclusion in and exclusion from consideration in the ordinal ranking.

6. The method of claim 1, wherein the step of generating an evaluation result set can occur concurrently for one or more of the raters.

7. The method of claim 1, wherein the referent data includes comparison groups of higher rated cases, peer rated cases and lower rated cases.

8. The method of claim 1, further comprising the step of, independently for each of the raters, recalibrating the scores in the evaluation result set based on a schema specified by the rater.

9. The method of claim 8, wherein the schema specifies that the scores be normalized to a common average.

10. The method of claim 1, wherein each of the pre-defined thresholds can be based on the time spent to generate an evaluation result.

11. The method of claim 1, wherein each of the pre-defined thresholds can be based on a comparison of a plurality of evaluation results in an evaluation result set.

12. The method of claim 1, the step of repeating the step of generating an evaluation result set to generate one or more additional evaluation result sets further comprises initializing one or more of the additional evaluation result sets to an empty set.

13. The method of claim 1, the step of repeating the step of generating an evaluation result set to generate one or more additional evaluation result sets further comprises initializing one or more of the additional evaluation result sets to the contents of the corresponding evaluation result set.

14. The method of claim 1, the step of aggregating and analyzing the collected evaluation results sets further comprising generating one or more ordinal rankings based on a sub-set of the collected evaluation results sets.

15. The method of claim 14, the step of aggregating and analyzing the collected evaluation results sets further comprising comparing the evaluation results sets and ordinal rankings for two or more raters based on similarities and differences.

16. The method of claim 1, further comprising the step of arranging the final ordinal ranking into a first grouping that meet an overall constraint and a second grouping that fails to meet an overall constraint.

17. A computer readable medium having recorded thereon instructions executable by a processor to perform a method for ordinal ranking, the instructions for:
  defining a case set containing a plurality of cases to be ranked;
  defining an attribute set containing a plurality of attributes for which a score can be assigned with regard to each case;
  assigning a weight to each of the plurality of attributes, wherein the sum of the weights equals a total weight;
  defining a plurality of raters;
  assigning decision fights to each of the raters, wherein the decision rights govern the raters participation in the steps of defining an attribute set and assigning weights;
  independently for each of the raters, generating an evaluation result set comprising one evaluation result for each one of the plurality of cases and wherein each evaluation result comprises scores, assigned by the rater, for each of the attributes in the attribute set with regard to the case;
  independently for each of the raters, generating and displaying to the rater, referent data as each evaluation result is generated in the step of generating an evaluation result set, wherein the referent data comprises a comparison group of cases for at least one attribute of the plurality of attributes;
  independently for each of the raters, monitoring and providing warnings to the rater if any of a plurality of pre-defined thresholds is violated;
  independently for each of the raters, repeating the step of generating an evaluation result set to generate one or more additional evaluation result sets, comparing the results of the evaluation result set and the one or more additional evaluation result sets, and providing the outcome of the comparison to the rater, wherein repeating the step of generating an evaluation result step comprises re-rating each one of the plurality of cases to obtain an additional evaluation result for each one of the plurality of cases and wherein each additional evaluation result comprises scores, assigned by the rater, for each of the attributes in the attribute set with regard to the case;
  collecting the evaluation result sets generated by each of the raters;
  aggregating and analyzing the collected evaluation results sets; and
  generating, responsive to a specified set of the evaluation result sets, a final ordinal ranking of the cases based on the scores contained in the specified set of evaluation result sets and the weights assigned to each of the plurality of attributes.

18. A computer system, comprising:
  a processor;
  a memory; and
  software instructions stored in the memory for enabling the computer system under control of the processor, to perform:
    defining a case set containing a plurality of cases to be ranked;
    defining an attribute set containing a plurality of attributes for which a score can be assigned with regard to each case;
    assigning a weight to each of the plurality of attributes, wherein the sum of the weights equals a total weight;
    defining a plurality of raters;
    assigning decision rights to each of the raters, wherein the decision rights govern the raters participation in the steps of defining an attribute set and assigning weights;
    independently for each of the raters, generating an evaluation result set comprising one evaluation result for each one of the plurality of cases and wherein each evaluation result comprises scores, assigned by the rater, for each of the attributes in the attribute set with regard to the case;
    independently for each of the raters, generating and displaying to the rater referent data as each evaluation result is generated in the step of generating an evaluation result set, wherein the rater referent data comprises a comparison group of cases for at least one attribute of the plurality of attributes;
    independently for each of the raters, monitoring and providing warnings to the rater if any of a plurality of pre-defined thresholds is violated;
    independently for each of the raters, repeating the step of generating an evaluation result set to generate one or more additional evaluation result sets, comparing the results of the evaluation result set and the one or more additional evaluation result sets, and providing the outcome of the comparison to the rater, wherein repeating the step of generating an evaluation result step comprises re-rating each one of the plurality of cases to obtain an additional evaluation result for each one of the plurality of cases;

collecting the evaluation result sets generated by each of the raters;

aggregating and analyzing the collected evaluation results sets; and generating, responsive to a specified set of the evaluation result sets, a final ordinal ranking of the cases based on the scores contained in the specified set of evaluation result sets and the weights assigned to each of the plurality of attributes.

* * * * *